(12) United States Patent
Lieven

(10) Patent No.: US 12,330,766 B2
(45) Date of Patent: Jun. 17, 2025

(54) AIRCRAFT FUSELAGE DOOR COMPRISING AN INTERNAL PANEL AND AN EXTERNAL PANEL, AND AIRCRAFT FUSELAGE PART COMPRISING SUCH A DOOR

(71) Applicant: Airbus Operations (S.A.S.), Toulouse (FR)

(72) Inventor: Patrick Lieven, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 23 days.

(21) Appl. No.: 18/239,577

(22) Filed: Aug. 29, 2023

(65) Prior Publication Data
US 2024/0083568 A1 Mar. 14, 2024

(30) Foreign Application Priority Data

Sep. 9, 2022 (FR) ...................................... 2209038

(51) Int. Cl.
*B64C 1/14* (2006.01)
*E05C 9/00* (2006.01)

(52) U.S. Cl.
CPC .......... *B64C 1/1461* (2013.01); *B64C 1/1423* (2013.01); *E05C 9/00* (2013.01)

(58) Field of Classification Search
CPC ...... B64C 1/1461; B64C 1/143; B64C 1/1438
See application file for complete search history.

(56) References Cited

U.S. PATENT DOCUMENTS 4,474,348 A * 10/1984 Skotte ..................... B64C 1/143
49/386
4,783,115 A * 11/1988 Galubensky ....... B60H 1/00507
454/143

| | | | |
|---|---|---|---|
| 5,251,851 A | 10/1993 | Herrmann | |
| 7,578,477 B2 | 8/2009 | French | |
| 10,189,556 B2 * | 1/2019 | Minchau | ................ B64C 1/1423 |
| 10,202,183 B2 * | 2/2019 | McCarthy | ............ B29C 33/0038 |
| 2009/0152398 A1 * | 6/2009 | Risch | ..................... B64C 1/1461 |
| | | | 244/129.5 |

(Continued)

FOREIGN PATENT DOCUMENTS

EP 2819919 B1 3/2017
GB 868390 A 5/1961

OTHER PUBLICATIONS

French Search Report for Application No. 2209038 dated Mar. 23, 2023.

*Primary Examiner* — Joshua J Michener
*Assistant Examiner* — Cindi M Curry
(74) *Attorney, Agent, or Firm* — KDW Firm PLLC

(57) ABSTRACT

An aircraft fuselage door with an internal and external panel, and an aircraft fuselage part with the door. The door includes a movable internal panel to be subjected to pressurization and an aerodynamic external panel, the external panel being on an external face of the internal panel by covering the surface of the external face and elastically linked to the internal panel to form an internal free space between them, the internal panel being movable relative to the external panel. The external panel includes a centering piece to ensure a self-centering function of the door allowing the internal panel to move independently with regard to the external panel when the door is in a closed position so a clearance between the periphery of the outer panel and the fuselage can be reduced, thereby reducing drag at the outer surface of the door and improving the aerodynamic performance of the aircraft.

20 Claims, 5 Drawing Sheets

(56) References Cited

U.S. PATENT DOCUMENTS

| | | | |
|---|---|---|---|
| 2015/0014483 A1* | 1/2015 | Minchau | B64C 1/1461 244/129.5 |
| 2015/0047275 A1* | 2/2015 | McCarthy | B64C 1/14 52/204.51 |
| 2017/0183079 A1* | 6/2017 | Minchau | B64C 1/1423 |

* cited by examiner

AIRCRAFT FUSELAGE DOOR COMPRISING AN INTERNAL PANEL AND AN EXTERNAL PANEL, AND AIRCRAFT FUSELAGE PART COMPRISING SUCH A DOOR

TECHNICAL FIELD

The disclosure herein relates to an aircraft fuselage door comprising an external panel resiliently connected to a movable internal panel, and an aircraft fuselage part comprising such a door.

BACKGROUND

It is known that the fuselage doors of an aircraft, for example a cargo plane, which provide access to the inside of the aircraft, are important elements subject to very strict specifications. This is because these doors must fulfill several essential functions and meet many criteria, in particular for safety reasons.

On the one hand, fuselage doors must create a seal between the inside and the outside of the aircraft, to allow the passenger cabin to be pressurized. On the other hand, they must perform an aerodynamic function. To this end, their external surface must fit seamlessly into the external surface of the aircraft such that the fuselage is aerodynamic in the door area, in other words, smooth and without openings in particular.

However, because aircraft doors are subjected to cabin pressurization, they can become deformed and/or move slightly relative to their frame. Moreover, doors are elements with complex kinematics and tolerance chains. For these reasons, it is necessary to provide functional clearances. These functional clearances generally take the form of a gap between the peripheral edge of the fuselage doors on their external face, and the fuselage. The flow of air along the fuselage can be disrupted by this gap, which may give rise to a fall in the aerodynamic performance of the aircraft, in particular by increasing drag.

Such a situation is not entirely satisfactory.

SUMMARY

It is an aim of the disclosure herein to propose a solution to overcome the abovementioned drawback.

The disclosure herein relates to an aircraft fuselage door comprising a movable internal panel intended to be subjected to pressurization.

According to the disclosure herein, the door further includes an aerodynamic external panel, the external panel being arranged on a face referred to as the external face of the internal panel, covering the surface of the external face and being resiliently connected to the internal panel in such a way as to form an internal free space between them.

In the context of the disclosure herein:
the terms "external" or "outside" apply to an element located on the outside of the aircraft AC or toward the outside of the aircraft AC; and
the terms "internal" or "inside" apply to an element located on the inside of the aircraft AC or toward the inside of the aircraft AC.

Thus, the disclosure herein provides a fuselage door which has two different elements, the internal panel and the external panel, which fulfill different functions. The external panel has an aerodynamic function, while the internal panel performs the functions of pressurization and of opening and closing of the door. Moreover, the resilient connection between them allows a (slight) movement of the internal panel without giving rise to any movement of the external panel. The door may thus be produced with a clearance between its periphery and the fuselage, which is reduced. Consequently, the drag on the external surface of the door is reduced and the aerodynamic performance of the aircraft is improved.

Advantageously, the door includes at least a plurality of resilient elements arranged between the external panel and the internal panel, the resilient elements being adapted to resiliently connect the external panel to the internal panel.

Moreover, advantageously, the external panel and the internal panel each have a substantially rectangular shape and the door includes at least four resilient elements arranged respectively in the four corners of the rectangular shape of the external panel and of the internal panel.

In a preferred embodiment, the resilient elements correspond to leaf springs.

Furthermore, advantageously, the internal panel is adapted to be moved relative to the external panel so as to be moved toward or away from the external panel, the internal panel being adapted to:
push the external panel when it is moved toward the external panel, coming into contact, at least partially, with the external panel; and
pull the external panel with it when it is moved away from the external panel.

Moreover, advantageously, the external panel has at least an access hatch for allowing access to the internal panel.

The disclosure herein also relates to an aircraft fuselage part. According to the disclosure herein, the fuselage part includes at least a door as described above and a door frame receiving the door.

Advantageously, the external panel includes at least a centering piece arranged on at least a part of the periphery of the external panel, the centering piece comprising a face referred to as the contact face configured to interact with a face referred to as the complementary face of the frame, the contact face being intended to come into contact with the complementary face when the door is in a closed position.

Also advantageously, the contact face of the centering piece and the complementary face of the frame are configured such that the contact between the contact face and the complementary face corresponds to frustoconical contact.

Furthermore, advantageously, the internal panel of the door includes at least a seal arranged on the periphery of the internal panel, the seal being adapted to come into contact with an edge of the frame when the door is in a closed position.

Moreover, advantageously, the door includes a plurality of latches adapted to block or to allow a movement of the internal panel relative to the frame when the door is in a closed position.

The disclosure herein also relates to an aircraft. According to the disclosure herein, the aircraft includes at least a door and/or at least a fuselage part as described above.

BRIEF DESCRIPTION OF THE DRAWINGS

The attached figures will clearly explain how the disclosure herein may be implemented. In these figures, identical reference signs designate similar elements.

DETAILED DESCRIPTION

The door 1 illustrating the disclosure herein is shown in particular embodiments in FIG. 1 to FIG. 6D. The door 1 corresponds to a door arranged in a fuselage 2 of an aircraft AC. The aircraft AC, for example a cargo plane, a fuselage part 4 of which is shown partially in FIG. 1, includes doors such as the door 1 for accessing the inside of the aircraft AC from the outside, and vice versa. In a non-limiting manner, the door 1 may correspond to any type of door of the fuselage 2 of the aircraft AC, and in particular to a door to a passenger cabin, an emergency door or a door to the hold.

Figure 1:
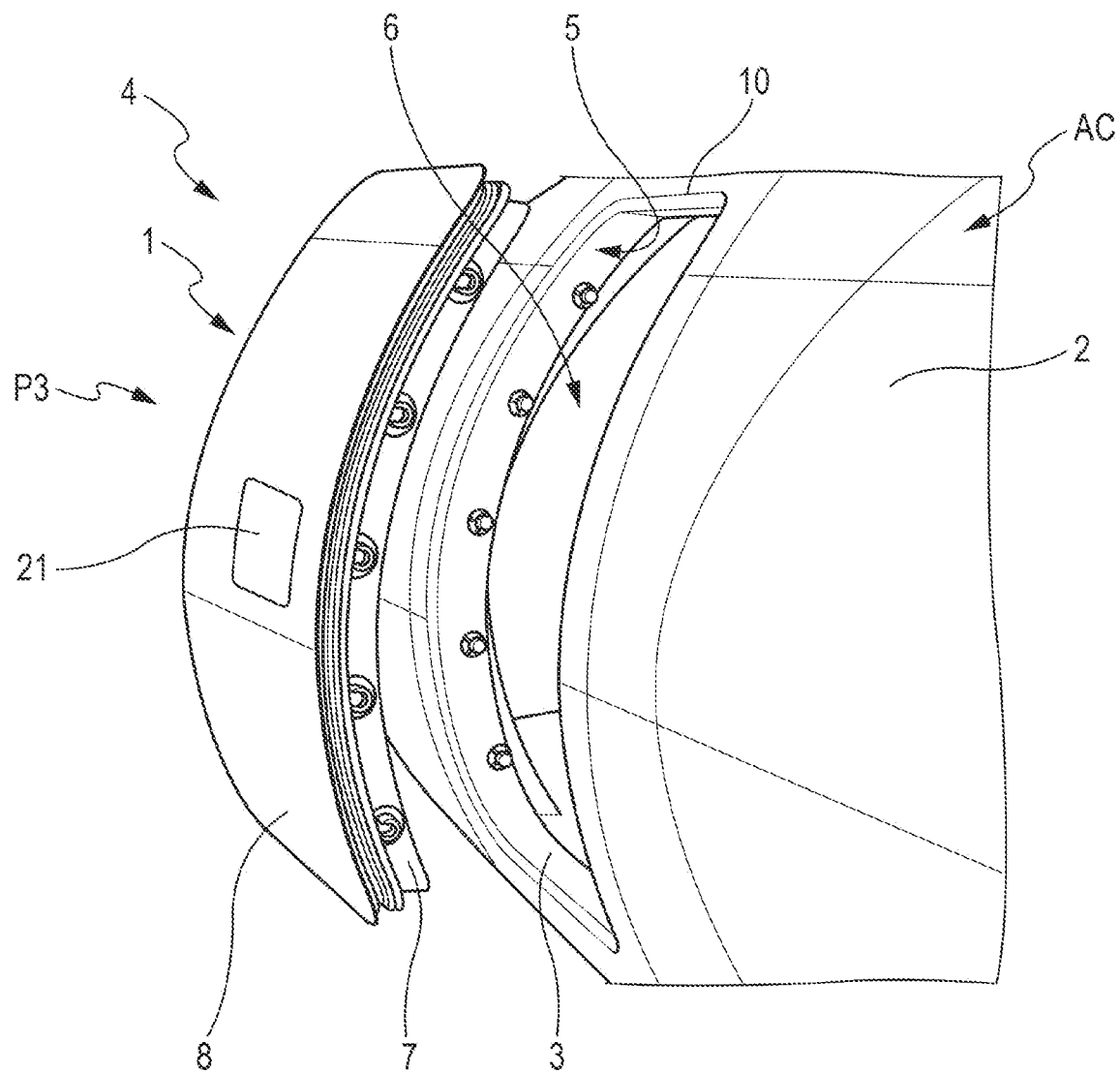
FIG. 1 is a partial view, in perspective, of an aircraft fuselage part, having a door frame and a door according to one particular embodiment of the disclosure herein.
Figure 2:
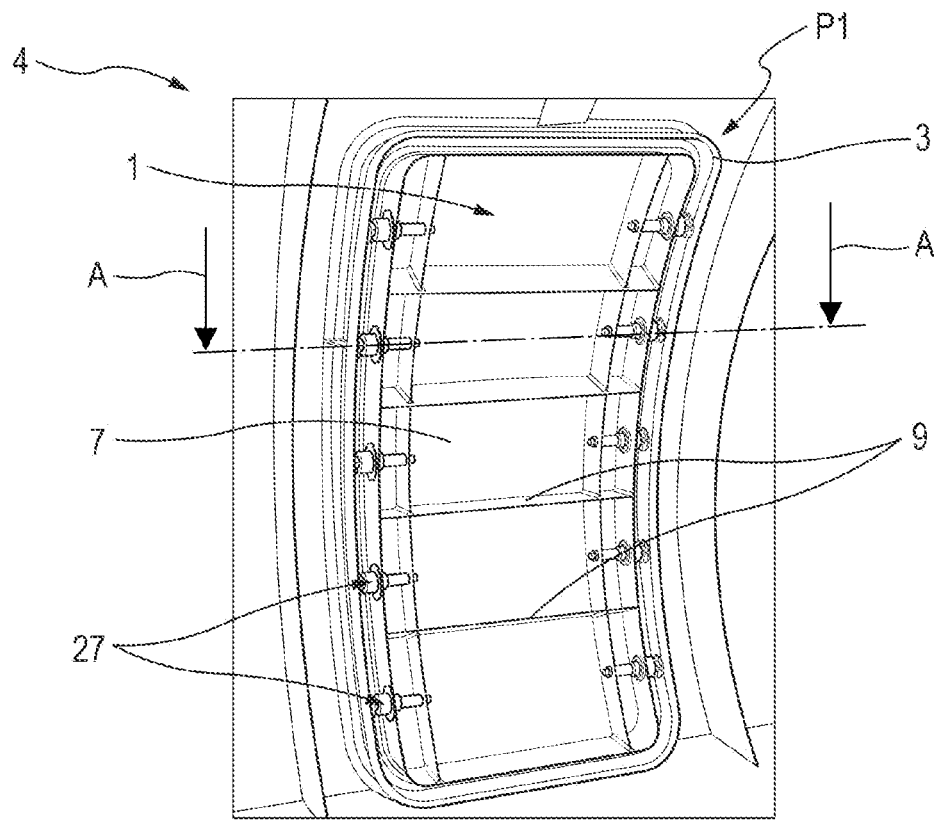
FIG. 2 is a view, in perspective, of a portion of the door frame and the door of FIG. 1, seen from inside the aircraft.

As shown in FIG. 1 and FIG. 2, the door 1 is mounted in a door frame 3 (hereinafter the "frame") of the fuselage 2. The frame 3 is integrated in the fuselage part 4 which will be described in more detail in the rest of the description. The frame 3 comprises, in particular, a surface 5 delimiting the periphery of an opening 6 passing through the frame 3. The opening 6 allows communication between the inside and the outside of the aircraft AC. Moreover, the door 1 is configured such that it can open and close the opening 6, by being moved away from or placed in contact with the frame 3, respectively. To this end, the door 1 is connected to the frame 3 by a conventional opening and closing mechanism (not shown).

In the context of the disclosure herein:

the door 1 is the to be "closed" when it is in a closed position P1 (FIG. 6A and FIG. 6B), in which it is in contact with the frame 3 on which it is fitted, in such a way as to fully close off the opening 6 of the frame 3;

the door 1 is said to be "open" when it is in an open position P3 (FIG. 6D), in which it is moved away from the frame 3 on which it is fitted, in such a way as to leave clear the opening 6 of the frame 3; and the door 1 is said to be "partially open" when it is in an opening position P2 (FIG. 6C), corresponding to an intermediate position between the closed position P1 and the open position P3.

The door 1 includes an internal panel 7 arranged on an internal portion of the door 1, namely the portion intended to be oriented toward the inside of the aircraft AC. As shown, in particular, in FIG. 3 and FIG. 4, the internal panel 7 comprises an internal face 7A and an external face 7B.

"Panel" means a structural element in the form of a sheet that may have a wide variety of thicknesses. It may be a sheet such as sheet metal or a thicker structure of "sandwich board" type. Preferably, it is an element of generally curved shape corresponding substantially to the curvature of the fuselage 2 and more specifically a shape with a double curvature promoting the effect of pressurization.

In one particular embodiment shown in FIG. 2, the internal panel 7 includes, on its internal face 7A, stiffeners 9 for stiffening the internal panel 7. The internal panel 7 thus stiffened may comprise hollow portions configured to receive conventional elements (not shown), for example trim elements or the usual mechanisms found in an aircraft door. Preferably, the internal panel 7 is made of metal. However, it may be made of various materials. In a non-limiting manner, the internal panel 7 has a thickness of between 100 mm and 200 mm, and for example a thickness of around 120 mm.

Furthermore, the internal panel 7 is movable relative to the frame 3. It is configured to be housed in the opening 6 of the frame 3 when the door 1 is closed. The internal panel 7 includes in particular the conventional movement mechanism (not shown) for the door 1, for opening and closing the door 1. Moreover, when the door 1 is closed, the internal panel 7 is configured to come into contact with the frame 3 such that the internal panel 7 can be subjected to pressurization. This pressurization corresponds to conventional pressurizing of the inside of the aircraft AC, namely in particular the passenger cabin and the cockpit.

The door 1 also includes an external panel 8 arranged on the internal panel 7. The external panel 8 is configured to be housed in a housing 10 of the frame 3 when the door 1 is closed. This external panel 8 has an aerodynamic role. It is intended to be subjected to a flow of air, represented by an arrow E in FIG. 3, flowing on the outside of the aircraft AC along the fuselage 2 when the door 1 is closed. The external panel 8 has, toward the outside, a shape corresponding to the curved shape of the fuselage 2 in such a way as not to oppose the flow of air. Thus, when the door 1 is closed, the external surface of the external panel 8 is flush with the fuselage 2 such that the external surface of the aircraft AC is smooth and aerodynamic.

Figure 3:
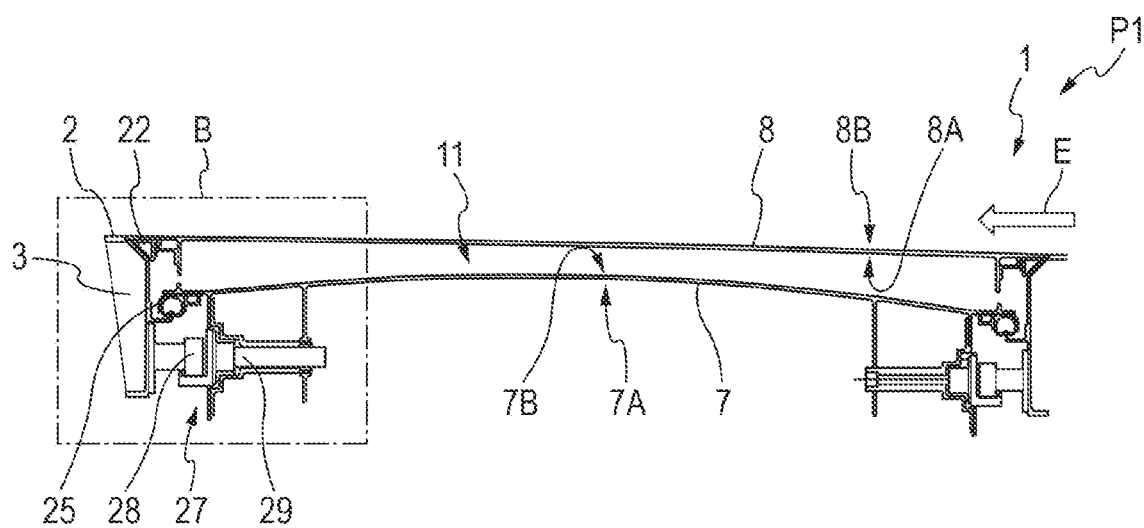
FIG. 3 is a cross section of the door frame and the door, along a section line A-A shown in FIG. 2.
Figure 4:
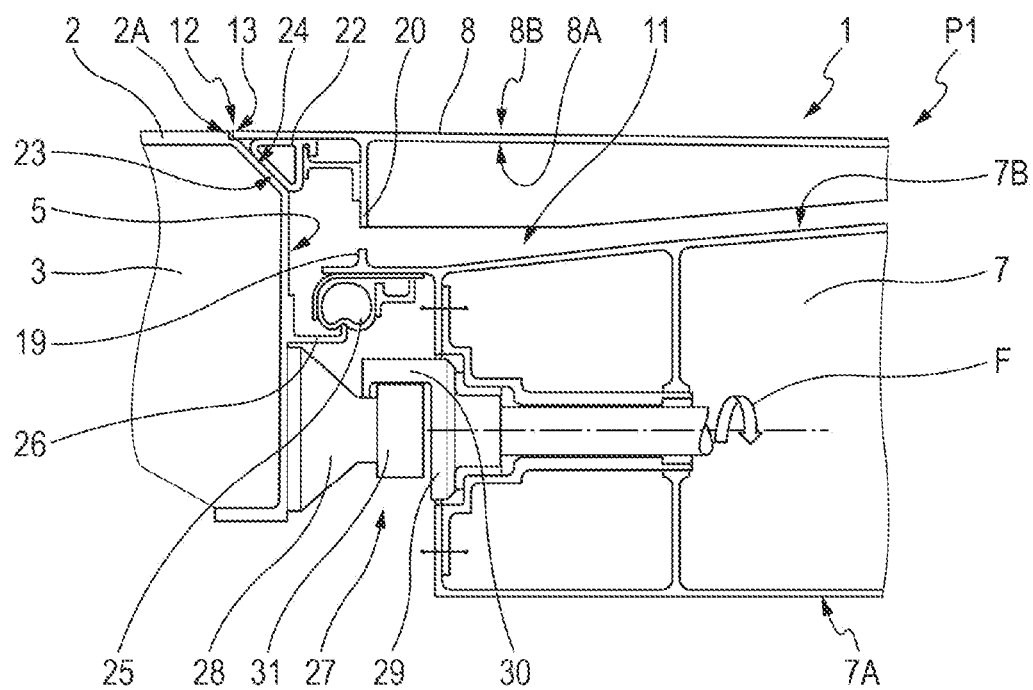
FIG. 4 is an enlarged view of a part of FIG. 3.
Figure 5:
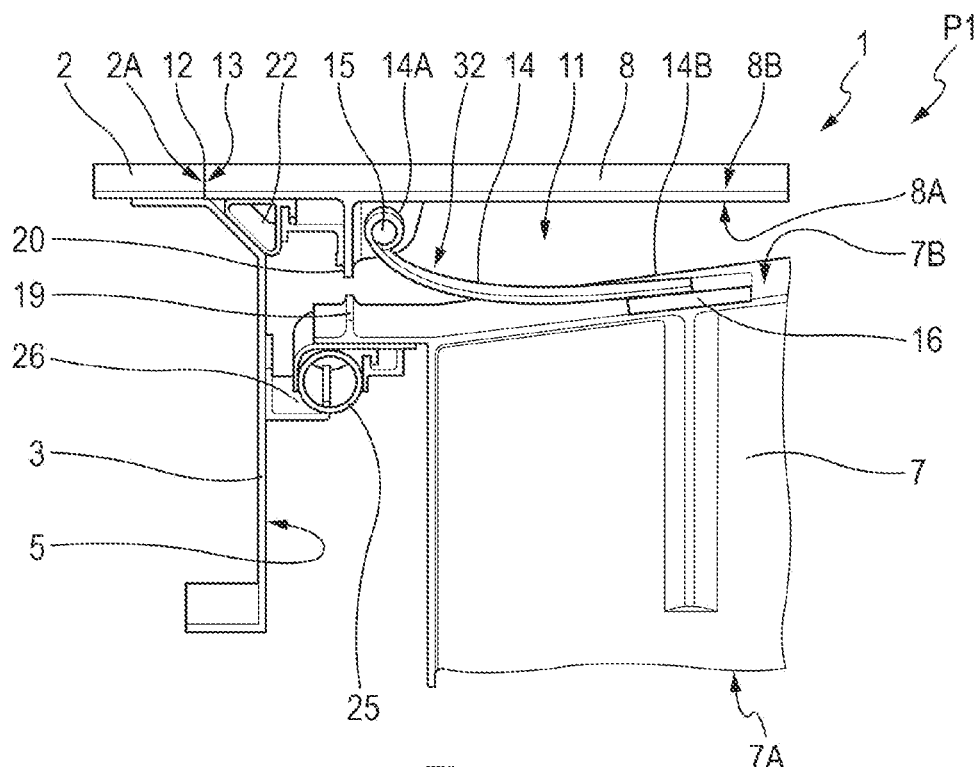
FIG. 5 is a view in section of an area for connection between an internal panel and an external panel of a door having a leaf spring according to one particular embodiment.

As shown in FIG. 3 to FIG. 5, the external panel 8 includes an internal face 8A and an external face 8B. The internal face 8A is arranged facing the external face 7B of the internal panel 7 in such a way as to cover the surface of the face 7B. The face 8B, for its part, is intended to be subjected to the flow of air and has an aerodynamic shape as described above. The external panel 8 is preferably made of metal, for example aluminum. However, it may be made of various materials. In a non-limiting manner, it has a thickness of between 20 mm and 30 mm, and for example a thickness of around 25 mm.

Moreover, the external panel 8 is resiliently connected to the internal panel 7 in such a way as to form a space, referred to as the free space 11, between the two panels. As shown in FIG. 3 to FIG. 5, the free space 11 is between the external face 7B of the internal panel 7 and the internal face 8A of the external panel 8. This free space 11 allows relative movement between the internal panel 7 and the external panel 8. More specifically, the free space 11 is provided to allow movement of the internal panel 7 relative to the external panel 8. This movement may in particular correspond to a movement or to a deformation of the internal panel 7, caused for example by the pressurization of the cabin.

Thus, the door 1 is provided with two different elements (the internal panel 7 and the external panel 8) which perform different functions, namely an aerodynamic function in the case of the external panel 8 and functions of pressurization and of opening and closing in the case of the internal panel 7. Moreover, the panels 7 and 8 are resiliently connected to one another, which allows a (slight) movement of the internal panel 7 without movement of the external panel 8.

For example, when the door 1 is closed and the cabin of the aircraft AC is pressurized, the internal panel 7 is likely to undergo deformation and/or to move slightly owing to the difference in pressure between the inside and the outside of the aircraft AC. In this instance, the resilient connection between the internal panel 7 and the external panel 8 is adapted to absorb this deformation and/or this movement of the internal panel 7 without transmitting it to the external panel 8.

Consequently, as shown in FIG. 4 (which is an enlarged view of the part of FIG. 3 delimited by a box B), a clearance 12 which exists between the external panel 8 and the fuselage 2 is small. This clearance 12 corresponds to a spacing between an edge 2A of the fuselage 2 and an edge 13 of the external panel 8. More specifically, the edge 2A corresponds to the contour of the fuselage 2 delimiting the housing 10 in which the external panel 8 is intended to be housed when the door 1 is closed. Moreover, the edge 13 corresponds to the external periphery of the external panel 8.

The clearance 12 is a functional clearance between the external panel 8 and the fuselage 2. Preferably, the clearance 12 corresponds to a distance between the edges 2A and 13 which is between 1 mm and 2 mm. Such a small clearance 12 makes it possible to significantly limit the drag on the external surface of the fuselage 2 and hence to improve the aerodynamic performance of the aircraft AC. This improvement is all the greater in the case of certain aircraft, for example of sailwing type, in which the fuselage doors are integrated in external surfaces having a non-zero angle relative to the direction of the flow of air.

Moreover, the door 1 as described above allows the external panel 8 to be pressed against the frame 3 when the door 1 is closed, in such a way as to prevent the presence of a small cavity which may usually be found at the interface between a door and a fuselage in some aircrafts. The absence of this small cavity makes it possible to reduce drag on the external surface of the fuselage 2.

Moreover, the door 1 having the small clearance 12 makes it possible to increase the comfort in particular for passengers in the cabin of the aircraft AC, by limiting the noise caused by the flow of air at the clearance 12.

Furthermore, the door 1 has a simplified design, in particular as regards tolerances of the door 1. To be specific, the pressurization function is intended to be performed by the internal panel 7 alone. Thus, the internal panel 7 must be subject to strict tolerances linked to the pressurization while the external panel 8 is not however subject to such strict tolerances. This makes it possible in particular to reduce, and hence simplify, the chain of dimensions of the door 1. Likewise, only the internal panel 7 has to be subject to specific adjustments on the ground, related to the deformation it is likely to undergo as a result of pressurization. This makes it possible to simplify the fitting of the door 1.

Moreover, the internal panel 7 and the external panel 8 are separate elements, and it is therefore possible to give each of them a slightly different shape. Their shapes do not have to be correlated with one another. For example, the internal panel 7 may have a shape with a specific curvature designed to distribute the stresses arising from the pressurization of the cabin, in particular a shape with a double curvature, and the external panel 8 may have another shape independent of the pressurization, allowing greater freedom in terms of design. For example, the external panel 8 may have an ovoid shape making it possible to reduce the effects that usually arise from door corners.

Furthermore, since the external panel 8 is separate from the internal panel 7, it may provide protection against impacts. To be specific, the external panel 8 may be configured to withstand specific impacts or shocks, for example those caused by birds. Moreover, the external panel 8 may, for example, be deformed by an impact without this having any effect on the internal panel 7 or any repercussions for the pressurization of the cabin.

In one particular embodiment, the door 1 includes a plurality of resilient elements 32 arranged between the external panel 8 and the internal panel 7. These resilient elements 32 are adapted to resiliently connect the external panel 8 to the internal panel 7. They may correspond to conventional resilient elements made of metal or a composite material.

In a particular implementation of this embodiment, the external panel 8 and the internal panel 7 have a substantially rectangular shape. Moreover, the door 1 includes at least four resilient elements 32 arranged respectively at the four corners of the rectangular shape of the external panel 8 and of the internal panel 7.

In a preferred embodiment shown in FIG. 5, the resilient elements 32 correspond to leaf springs 14. FIG. 5 shows the arrangement of a leaf spring 14 in a corner of the rectangular shape of the external panel 8 and of the internal panel 7. The door 1 includes a leaf spring 14 arranged in a similar way in each of the other three corners.

Each leaf spring 14 has two ends, an end 14A with an eyelet and an end 14B. The end 14A with an eyelet is mounted about a pin 15 provided on a plate connected to the face 8A of the external panel 8. The free end 14B, for its part, is secured to an attachment 16 provided on the face 7B of the internal panel 7. The leaf springs 14 thus arranged make it possible to resiliently connect the external panel 8 to the internal panel 7, as described above. Furthermore, the leaf springs 14 also make it possible to support the external panel 8. These leaf springs 14 are also adapted to act as a "geometric fuse" making it possible to reduce the chain of dimensions between the external panel 8 and the frame 3. Moreover, by being associated with a self-centering function performed by a centering piece 22 described below, they help reduce the clearance 12.

In a preferred embodiment, the leaf springs 14 are made of a composite material. Since the free space 11 between the internal panel 7 and the external panel 8 is not pressurized, it may be exposed to the conditions outside the aircraft AC, in particular to temperature fluctuations. Having leaf springs 14 made of a composite material makes it possible to avoid variations in mechanical properties likely to be caused by the temperature fluctuations. Moreover, it is easier to make leaf springs 14 out of a composite material than other types of resilient elements.

As shown in FIG. 6A to FIG. 6D, the internal panel 7 is adapted to be moved relative to the external panel 8 in such a way that it can be moved toward the external panel 8 (as shown by an arrow D). It is also adapted to be moved in a direction away from the external panel 8 (in the opposite direction to the arrow D). To be specific, movement of the internal panel 7 relative to the external panel 8 is provided for not only to allow movements of the internal panel 7 pressurized as described above, but also to open and close the door 1. An example of such opening of the door 1 is described in detail below in the description.

In one particular embodiment, the internal panel 7 is configured to be movable in translation. However, in other embodiments, it may be configured to be moved in other conventional ways. The internal panel 7 may be moved manually by an operator or with the assistance of conventional movement mechanisms (not shown).

As shown in FIG. 6A to FIG. 6D, the door 1 includes guide systems 17 arranged between the internal panel 7 and the external panel 8. In one particular embodiment, each guide system 17 includes rails 18A arranged on the internal panel 7 and a slider 18B arranged on the external panel 8. The rails 18A and the slider 18B are configured to interact with one another such that the slider 18B guides the rails 18A when the internal panel 7 is moved relative to the external panel 8.

Figure 6A:
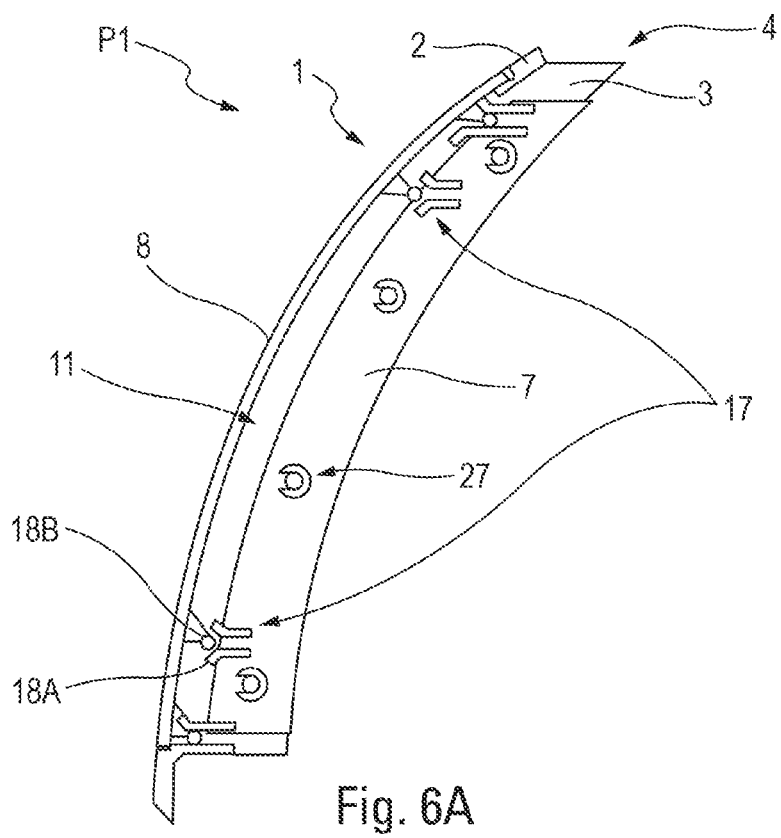
FIG. 6A is a schematic view, in cross section, of an aircraft fuselage part having a door frame and a door, in a closed position of the door, the door being locked.
Figure 6B:
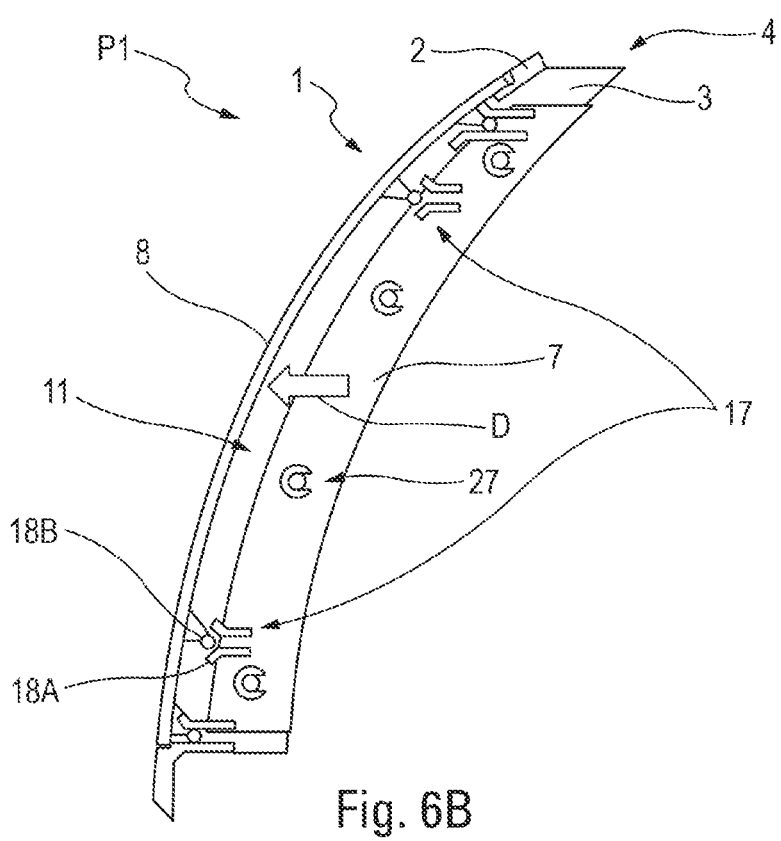
FIG. 6B is a view similar to FIG. 6A in the closed position of the door, the door being unlocked.

The internal panel 7 is configured to be movable in a direction toward the external panel 8, as shown by the arrow D in FIG. 6B, in such a way as to come into contact with the external panel 8. More specifically, the face 7B of the internal panel 7 is configured to be able to come into contact, at least partially, with the face 8A of the external panel 8. The internal panel 7, thus in contact with the external panel 8, is adapted to push the latter toward the outside of the aircraft AC so as to open the door 1. Conversely, the internal panel 7 is also configured to be movable in a direction away from the external panel 8. The resilient elements 32 connecting the internal panel 7 to the external panel 8 make it possible to pull the external panel 8 toward the inside of the aircraft AC so as to close the door 1.

In one particular embodiment, shown in FIG. 3 to FIG. 5, the door 1 includes stop elements between the internal panel 7 and the external panel 8. These stop elements correspond to an edge 19 located on the face 7B of the internal panel 7 and an edge 20 located on the face 8A of the external panel 8. The edges 19 and 20 extend in the free space 11, protruding and facing one another. They have, to be specific, shapes adapted to come into contact with one another in such a way as to allow the internal panel 7, when it is moved toward the external panel 8, to push the latter.

Furthermore, in one particular embodiment shown schematically in FIG. 1, the external panel 8 is provided with an access hatch 21. The hatch 21 is made through the external panel 8 and is intended to provide access to the internal panel 7 so as to be able to actuate a handle (not shown) on the internal panel 7. The handle on the internal panel 7 makes it possible to open and close the door 1 from outside the aircraft AC.

In the embodiment shown in FIG. 3 to FIG. 5, the external panel 8 also includes the centering piece 22 arranged all along the periphery of the external panel 8. The centering piece 22, which is intended to perform a self-centering function, is secured to the face 8A of the external panel 8 and comprises a contact face 23 oriented toward the inside of the aircraft AC. Moreover, the frame 3 includes, at the periphery of the surface 5, a complementary face 24 (oriented toward the outside of the aircraft AC), which is complementary to the face 23. The faces 23 and 24 are configured to interact by coming to the contact with one another when the door 1 is closed.

Preferably, as shown in FIG. 3 to FIG. 5, the face 23 of the centering piece 22 and the face 24 of the frame 3 are configured such that the contact between them corresponds to frustoconical contact. To be specific, the faces 23 and 24 are inclined relative to one another in such a way as to make the frustoconical contact when the door 1 is closed. By way of example, the face 24 may correspond to a chamfer adapted to receive the centering piece 22. Furthermore, the centering piece 22 may be made of a deformable material in such a way as to be able to match the shape of the face 24 when the door 1 is closed. The centering piece 22, thus interacting with the frame 3, is adapted to ensure centering of the door 1 in the frame 3.

Moreover, the centering piece 22 may correspond to a conventional seal, adapted to perform the centering function described above. It thus also performs a function of sealing with respect to the outside when the door 1 is closed.

In one particular embodiment, shown in FIG. 3 to FIG. 5, the internal panel 7 of the door 1 further includes a seal 25 arranged on the periphery of the internal panel 7. The seal 25 is adapted to come into contact with an edge 26 of the surface 5 of the frame 3 when the door 1 is closed. The seal 25 and the edge 26 thus in contact are adapted to seal the door 1 for the pressurization of the cabin of the aircraft AC. More specifically, this seal only concerns the internal panel 7 such that the external panel 8 and the free space 11 are not pressurized.

In one particular embodiment, the door 1 includes a conventional heating system (not shown) for heating between the internal panel 7 and the external panel 8. For example, it may be a heating element or a hot air intake. Such a heating system is in particular adapted for de-icing the free space 11 and/or the centering piece 22.

Furthermore, as shown in FIG. 1 to FIG. 4, the fuselage part 4 comprising the frame 3 and the door 1 further includes a locking system. This locking system is adapted to lock the door 1 in such a way as to keep it closed, and conversely to unlock the door 1 in such a way as to release it so that it can be opened. More specifically, the locking system comprises a plurality of latches 27 arranged in the thickness of the door 1 and distributed at least over a part of its contour.

Preferably, the latches 27 correspond to C-latches. As shown in FIG. 3 and FIG. 4, each of the latches 27 includes a fixed post 28 arranged on the surface 5 of the frame 3, and a movable bolt 29 arranged on the internal panel 7. The bolt 29 is in particular configured to be able to pivot as indicated by an arrow F in FIG. 4. The bolt 29 has an end 30 in the shape of a hook (or a "C") configured to interact with an end 31 of the post 28. Specifically, the end 30 is adapted to block the movement of the door 1 when the bolt 29 is pivoted into a locked position (FIG. 3) and to allow the door 1 to move toward the outside of the aircraft AC when the bolt 29 is pivoted into in an unlocked position (FIG. 4).

This simplifies opening and closing of the door 1 comprising the latches 27. To be specific, the latches 27 and the configuration of the door 1 make it possible to disengage and engage the door 1 without the need for a door lifting movement. Disengagement and engagement correspond to movements of the door 1 in order, respectively, to disengage and engage the bolts 29 in the posts 28 in such a way as to be able to lock or unlock the door 1. This movement is conventionally carried out with the aid of a lifting mechanism such as a cylinder and consists in lifting the door 1 by a few centimeters. The door 1 allows disengagement and engagement without lifting. It therefore does not need a lifting mechanism, which represents a saving in terms of bulk and weight.

Figure 6C:
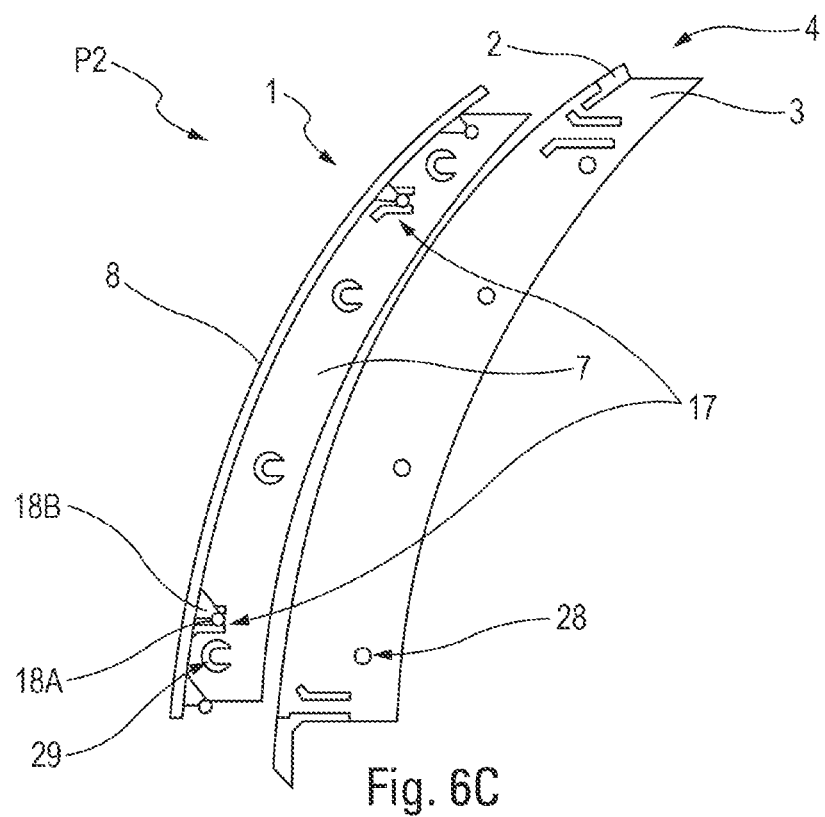
FIG. 6C is a view similar to FIGS. 6A and 6B, in a position of opening of the door.
Figure 6D:
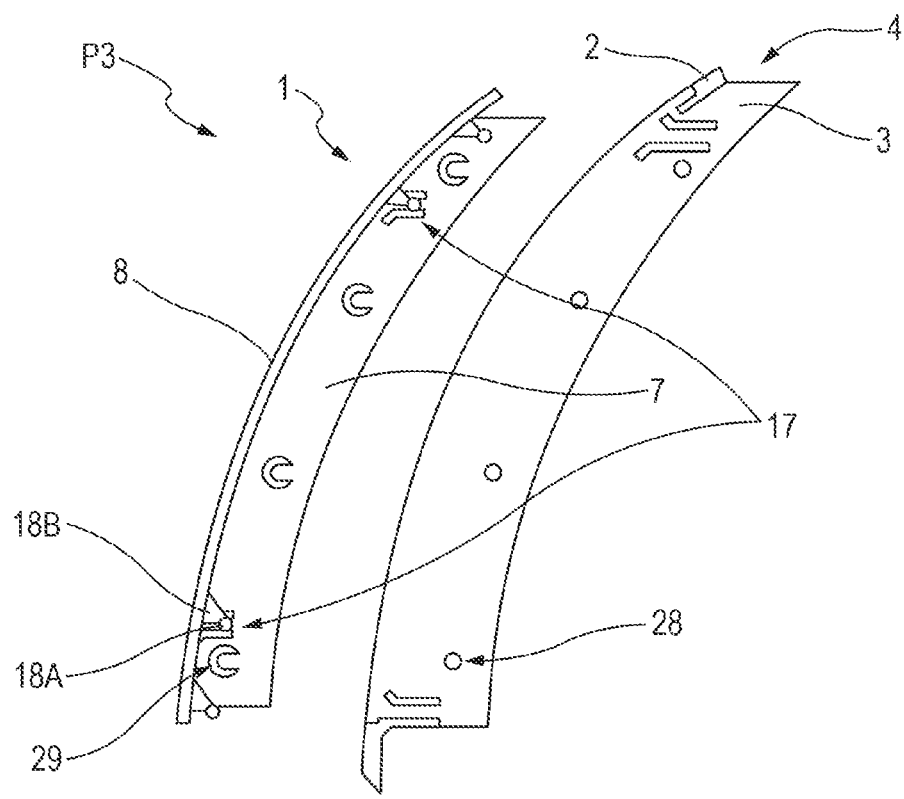
FIG. 6D is a view similar to FIGS. 6A, 6B and 6C, in an open position of the door.

The door 1, as described above, may be opened and closed by being placed successively in various positions: the closed position P1 shown in FIG. 6A and FIG. 6B, the opening position P2 shown in FIG. 6C and the open position P3 shown in FIG. 6D.

In the closed position P1 (FIG. 6A and FIG. 6B), the door 1 hermetically seals the opening 6 of the frame 3 in such a way as to allow pressurization of the cabin. In this closed position P1, the internal panel 7 is placed in the opening 6 by being pressed against the edge 26 of the frame 3 and locked with the aid of the plurality of latches 27. Moreover, the external panel 8 is housed in the housing 10 by being pressed against the frame 3. The external panel 8 is pressed against the frame 3 by the resilient connection between the internal panel 7 and the external panel 8. To be specific, as shown in FIG. 5, the leaf springs 14 are adapted to pull the external panel 8 toward the inside of the aircraft and to hold it firmly against the frame 3. The external panel 8 thus pressed is configured such that its external face 8B is flush with the external surface of the fuselage 2.

To open the door 1, the latches 27 are unlocked in such a way as to allow the door 1 to move. The door 1 is then pushed toward the outside of the aircraft AC in the opening position P2 (FIG. 6C) in which it opens the opening 6. The internal panel 7 is thus moved in the direction toward the external panel 8. Initially, the resilient connection between the internal panel 7 and the external panel 8 absorbs the movement of the internal panel 7. The internal panel 7 thus moves closer to the external panel 8, reducing the free space 11 between them. Next, the internal panel 7 comes into contact with the external panel 8 and brings it along with it by pushing it toward the outside of the aircraft AC.

Once the door 1 is moved fully toward the outside of the aircraft AC, it is in the open position P3 (FIG. 6D) in which it allows passage through the opening 6, for example the passage of passengers of the aircraft AC. The door 1 may then be reclosed, following the reverse procedure to that followed for opening.

The door 1 of the fuselage part 4 of the aircraft AC, comprising the external panel 8 resiliently connected to the internal panel 7, as described above, has many advantages. In particular:

- it makes it possible to disassociate the aerodynamic function performed by the external panel 8 from the functions of pressurization and of opening and closing the door 1 performed by the internal panel 7;
- it makes it possible to reduce the clearance 12 existing between the fuselage 2 and the external panel 8;
- it makes it possible to reduce the drag on its external surface;
- it makes it possible to improve the aerodynamic performance of the aircraft AC;
- it has a simplified design, in particular in terms of the chain of dimensions;
- its fitting is simplified, in particular in terms of adjustments on the ground;
- it makes it possible to reduce the noise caused by the flow of air on its external surface; and
- it makes it possible to ensure protection against shocks and/or impacts without repercussions for the pressurization of the cabin.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage door comprising:
   a movable internal panel configured to create a seal between an inside and an outside of an aircraft to which the aircraft fuselage door is attached and to allow a passenger cabin of the aircraft to be pressurized;
   an aerodynamic external panel on an external face of the internal panel, in a position to cover a surface of the external face; and
   a resilient connection between and connecting the external panel and the internal panel to form an internal free space between the internal panel and the external panel, such that the internal panel is movable relative to the external panel;
   wherein the resilient connection is configured to isolate the external panel from a movement of the internal panel relative to the external panel.

2. The aircraft fuselage door of claim 1, wherein the resilient connection comprises a plurality of resilient elements between the external panel and the internal panel, wherein the resilient elements are configured to resiliently connect the external panel to the internal panel.

3. The aircraft fuselage door of claim 2, wherein:
   the external panel and the internal panel each have a substantially rectangular shape; and
   the aircraft fuselage door includes at least four resilient elements, each of which is arranged respectively in one of four corners of the rectangular shape of the external panel and of the internal panel.

4. The aircraft fuselage door of claim 2, wherein the resilient elements comprise leaf springs.

5. The aircraft fuselage door of claim 1, wherein:
   the internal panel is movable relative to the external panel to be moved toward or away from the external panel; and,
   when the internal panel is moved toward the external panel, coming into contact, at least partially, with the external panel, the resilient connection is configured to allow the internal panel to push the external panel towards the outside of the aircraft, so as to open the aircraft fuselage door; and
   when the internal panel is moved away from the external panel, the resilient connection is configured to pull the external panel with the internal panel, so as to close the aircraft fuselage door.

6. The aircraft fuselage door of claim 1, wherein the external panel has at least an access hatch for allowing access to the internal panel.

7. An aircraft fuselage part comprising:
   the aircraft fuselage door of claim 1; and
   a door frame configured to receive the aircraft fuselage door.

8. The aircraft fuselage part of claim 7, wherein:
   the external panel includes at least a centering piece on at least a part of a periphery of the external panel;
   the centering piece comprises a contact face configured to interact with a complementary face of the door frame; and
   the contact face is configured to come into contact with the complementary face when the aircraft fuselage door is in a closed position.

9. The aircraft fuselage part of claim 8, wherein the contact face of the centering piece and the complementary face of the door frame are configured such that the contact between the contact face and the complementary face corresponds to frustoconical contact.

10. The aircraft fuselage part of claim 7, wherein:
the internal panel of the aircraft fuselage door includes at least a seal on a periphery of the internal panel; and
the seal is configured to come into contact with an edge of the door frame when the aircraft fuselage door is in a closed position.

11. The aircraft fuselage part of claim 7, wherein the aircraft fuselage door includes a plurality of latches configured to block or to allow a movement of the internal panel, relative to the door frame, when the aircraft fuselage door is in a closed position.

12. An aircraft comprising the aircraft fuselage part of claim 7.

13. The aircraft fuselage door of claim 1, wherein the resilient connection between and connecting the internal panel and the external panel is configured to absorb a deformation and/or a movement of the internal panel without transmitting the deformation and/or the movement of the internal panel to the external panel.

14. The aircraft fuselage door of claim 1, wherein the resilient connection comprises a plurality of resilient elements between the external panel and the internal panel, wherein the resilient elements are configured to resiliently connect the external panel to the internal panel.

15. The aircraft fuselage door of claim 14, wherein the resilient elements are made of a metal.

16. The aircraft fuselage door of claim 14, wherein the resilient elements are made of a composite material.

17. An aircraft fuselage door comprising:
a movable internal panel configured to be subjected to pressurization, for pressurizing an interior of a passenger cabin of the aircraft;
an aerodynamic external panel on an external face of the internal panel, in a position to cover a surface of the external face; and
a resilient connection between and connecting the external panel and the internal panel to form an internal free space between the internal panel and the external panel, such that the internal panel is movable relative to the external panel;
wherein the resilient connection comprises a plurality of resilient elements between the external panel and the internal panel; and
wherein the resilient elements comprise leaf springs.

18. The aircraft fuselage door of claim 17, wherein:
the external panel and the internal panel each have a substantially rectangular shape; and
the aircraft fuselage door includes at least four resilient elements, each of which is arranged respectively in one of four corners of the rectangular shape of the external panel and of the internal panel.

19. The aircraft fuselage door of claim 17, wherein:
the internal panel is movable relative to the external panel to be moved toward or away from the external panel; and,
when the internal panel is moved toward the external panel, coming into contact, at least partially, with the external panel, the resilient connection is configured to allow the internal panel to push the external panel towards the outside of the aircraft, so as to open the aircraft fuselage door; and
when the internal panel is moved away from the external panel, the resilient connection is configured to pull the external panel with the internal panel, so as to close the aircraft fuselage door.

20. The aircraft fuselage door of claim 17, wherein the external panel has at least an access hatch for allowing access to the internal panel.

\* \* \* \* \*